(12) United States Patent
Yoshizawa et al.

(10) Patent No.: US 6,511,171 B2
(45) Date of Patent: Jan. 28, 2003

(54) INK SET FOR AN INK-JET RECORDING METHOD

(75) Inventors: Tomomi Yoshizawa, Tokyo (JP); Yasuhiko Kawashima, Tokyo (JP)

(73) Assignee: Konica Corporation, Tokyo (JP)

( * ) Notice: Subject to any disclaimer, the term of this patent is extended or adjusted under 35 U.S.C. 154(b) by 11 days.

(21) Appl. No.: 09/965,070

(22) Filed: Sep. 27, 2001

(65) Prior Publication Data

US 2002/0135649 A1 Sep. 26, 2002

(30) Foreign Application Priority Data

Dec. 25, 2000 (JP) ........................................ 2000-392500
Apr. 18, 2001 (JP) ........................................ 2001-119516

(51) Int. Cl.$^7$ ............................................. G01D 11/00
(52) U.S. Cl. ....................................................... 347/100
(58) Field of Search ...................... 347/100; 106/31.27, 106/31.13, 31.6

(56) References Cited

FOREIGN PATENT DOCUMENTS

EP 730970 * 2/1996

* cited by examiner

*Primary Examiner*—John Barlow
*Assistant Examiner*—Michael S Brooke

(57) ABSTRACT

An ink set for ink-jet recording comprising a group of inks exhibiting the same hue and having different color densities and containing a colorant, water-soluble organic solvent and water, wherein among the group of inks, an ink has a largest surface tension $\sigma 1$ and another ink has a smallest surface tension $\sigma 2$, and said $\sigma 1$ and said $\sigma 2$ satisfy the following conditional formula: $\sigma 2/\sigma 1 > 0.7$, and wherein at least one of the inks contains iron ions, magnesium ions, calcium ions such that a total amount of the iron ions, the magnesium ions and the calcium ions is not more than 10 ppm by weight.

28 Claims, No Drawings

INK SET FOR AN INK-JET RECORDING METHOD

FIELD OF THE INVENTION

The present invention relates to an ink set for an ink-jet recording method and a recording method using the same.

BACKGROUND OF THE INVENTION

Of currently practiced ink-jet recording methods, commonly adopted method is a method employing a pale color ink for printing low density areas and a dark color ink for printing high density areas in order to reproduce smooth gradation of the printed images. When ink-jet ink droplets are ejected onto an image receptive layer, dots are formed. Subsequently, said ink droplets penetrate into the interior of said image receptive layer, and at the same time, said ink droplets spread over the surface of said image receptive layer whereby dots adjacent to each other spread while being partially united.

When the added amount of dyes is markedly different between the pale ink and the dark ink, the surface tension of the pale ink is frequently different from that of the dark ink, even though surface active agents in the same amount are added. The surface tension also varies depending on the type of dyes.

Further, when colorants penetrate deep into portions of said ink receptive layer, the optical density of images often decreases.

Accordingly, the dot diameter of each color ink varies over an elapse of time, and the depth distribution of colorants also varies, whereby color variation occurs.

When the spread of colorants of the pale ink becomes different from that of the dark ink over a long period of time, the gradation of high density areas formed employing the dark ink is not allowed to be continuous with that of low density areas formed employing the pale ink after an elapse of time.

Namely, when density variation between the low density areas and the high density areas is not balanced, the gradation is deteriorated over an elapse of time, whereby problems occur in which smooth gradation is not assured.

When ink comprised of water-soluble dyes is used, said problems are particularly exhibited.

Furthermore, when the density of each color varies at an almost equal rate, color variation is not exhibited. However, when the density of each color is not balanced, color variation is further exhibited.

SUMMARY OF THE INVENTION

An object of the present invention is to provide an ink set capable of maintaining smooth gradation over an elapse of time after printing images, and also capable of maintaining color balance.

Said object can be achieved employing the embodiments described below.

1. An ink set for ink-jet recording, comprising:
    a group of inks exhibiting the same hue and having different color densities and containing a colorant, water-soluble organic solvent and water,
    wherein among the group of inks, an ink has a largest surface tension $\sigma 1$ and another ink has a smallest surface tension $\sigma 2$, and said $\sigma 1$ and said $\sigma 2$ satisfy the following conditional formula:

$$\sigma 2/\sigma 1 > 0.7, \text{ and}$$

wherein at least one of the inks contains iron ions, magnesium ions, calcium ions such that a total amount of the iron ions, the magnesium ions and the calcium ions is not more than 10 ppm by weight.
2. The ink set of item 1, wherein the inks each contain the iron ions of 0.01 to 3 ppm by weight.
3. The ink set of item 1, wherein the inks each contain the magnesium ions of not more than 2 ppm by weight.
4. The ink set of item 1, wherein the inks each contain the magnesium ions of 0.01 to 2 ppm by weight.
5. The ink set of item 1, wherein the inks each contain the calcium ions of not more than 3 ppm by weight.
6. The ink set of item 1, wherein the inks each contain silicon of not more than 10 ppm by weight.
7. The ink set of item 1, wherein the inks each contain nickel of not more than 2.0 ppm by weight.
8. The ink set of item 1, wherein the ink each contain barium of not more than 2.0 ppm by weight.
9. The ink set of item 1, wherein the inks each contain zinc of not more than 2.0 ppm by weight.
10. The ink set of item 1, wherein the inks each contain chromium of not more than 2.0 ppm by weight.
11. The ink set of item 1, wherein the inks each contain strontium of not more than 1.0 ppm by weight.
12. The ink set of item 1, wherein the inks each contain aluminum of not more than 5.0 ppm by weight.
13. The ink set of item 1, wherein the inks each contain zirconium of not more than 10 ppm by weight.
14. The ink set of item 1, wherein the inks each contain zirconium of not more than 2.0 ppm by weight.
15. The ink set of item 1, wherein the inks each contain manganese of not more than 2.0 ppm by weight.
16. The ink set of item 1, wherein an ink of the group of inks contains sodium ions of not more than 500 ppm by weight.
17. The ink set of item 1, wherein the inks each contain potassium ions of not more than 500 ppm by weight.
18. The ink set of item 1, wherein the inks each contain a complexing agent.
19. The ink set of item 1, wherein said $\sigma 1$ and said $\sigma 2$ satisfy the following conditional formula:

$$\sigma 2/\sigma 1 > 0.85.$$

20. The ink set of item 1, further comprising:
    another group of inks exhibiting the same another hue and having different color densities and containing a colorant, water-soluble organic solvent and water,
    wherein among all groups of inks, an ink has a largest surface tension $\sigma$max and another ink has a smallest surface tension $\sigma$min, and said $\sigma$max and said $\sigma$min satisfy the following conditional formula:

$$\sigma \text{min}/\sigma \text{max} > 0.6.$$

21. The ink set of item 1, further comprising:
    a second group of inks each ink of which has a different color density of the same second hue and contains a colorant, water-soluble organic solvent and water, the same second hue different from the same hue of the group of inks, and a third group of inks each ink of which has a different color density of the same third hue and contains a colorant, water-soluble organic solvent and water, the same third hue different from the same hue of the group of inks and the same second hue of the second group of inks, so that the ink set comprises seven different inks or more, wherein among each of the second group of inks and the third group of inks, an ink has a largest surface tension σ1 and another ink has a smallest surface tension σ2, and said σ1 and said σ2 satisfy the following conditional formula:

σ2/σ1>0.7.

22. The ink set of item 19, further comprising:
a second group of inks each ink of which has a different color density of the same second hue and contains a colorant, water-soluble organic solvent and water, the same second hue different from the same hue of the group of inks, and a third group of inks each ink of which has a different color density of the same third hue and contains a colorant, water-soluble organic solvent and water, the same third hue different from the same hue of the group of inks and the same second hue of the second group of inks, so that the ink set comprises seven different inks or more,
wherein among each of the second group of inks and the third group of inks, an ink has a largest surface tension σ1 and another ink has a smallest surface tension σ2, and said σ1 and said σ2 satisfy the following conditional formula:

σ2/σ1>0.85.

23. The ink set of item 20, wherein at least two of the inks exhibit black color and have different color densities.
24. The ink set of item 1, wherein the inks each contain a dihydric alcohol of not less than 50% by weight of water-soluble organic solvents contained in said ink.
25. An ink-jet recording method comprising the step of: jetting an ink of the ink set of item 1 from an ink-jet head to an ink-jet recording media;
wherein the recording media comprises a support having thereon a porous ink receptive layer containing inorganic particles and a hydrophilic binder.
26. The ink-jet recording method of item 25, wherein the inorganic particles are made of silica.
27. The ink-jet recording method of item 26, wherein the the porous ink receptive layer contains voids having a diameter of 10 to 100 nm.
28. The ink-jet recording method of item 27, wherein the porous ink receptive layer contains a cationic fixing agent.

DETAILED DESCRIPTION OF THE INVENTION

The present invention will now be detailed.
In the present invention, colored inks of the same color with different color density are prepared in such a manner that, for example, dark cyan and pale cyan inks are prepared by varying the concentration of cyan dyes.
The concentration of dyes of pale inks is preferably from ⅒ to ½ of that of dark inks.
Colorants are not particularly limited to, for example, pigments and dyes. However, since dyes are more diffusible, effects of the present invention is more exhibited. Listed as dyes are acidic dyes, direct dyes, basic dyes, reactive dyes, or food dyes.
Representative dyes are listed below. However, the present invention is not limited to these dyes.
<Direct Dyes>
C.I. Direct Yellow 1, 4, 8, 11, 12, 24, 26, 27, 28, 33, 39, 44, 50, 58, 85, 86, 100, 110, 120, 132, 142, and 144
C.I. Direct red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343

C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
C.I. Direct Black 2, 3, 7, 17, 19, 22, 32, 38, 51, 56, 62, 71, 74, 75, 77, 105, 108, 112, 117, and 154
<Acidic Dyes>
C.I. Acid Yellow 2, 3, 7, 17, 19, 23, 25, 20, 38, 42, 49, 59, 61, 72, and 99
C.I. Acid Orange 56 and 64
C.I. Acid Red 1, 8, 14, 18, 26, 32, 37, 42, 52, 57, 72, 74, 80, 87, 115, 119, 131, 133, 134, 143, 154, 186, 249, 254, and 256
C.I. Acid Violet 11, 34, and 75
C.I. Acid Blue 1, 7, 9, 29, 87, 126, 138, 171, 175, 183, 234, 236, and 249
C.I. Acid Green 9, 12, 19, 27, and 41
C.I. Acid Black 1, 2, 7, 24, 26. 48, 52, 58, 60, 94, 107, 109, 110, 119, 131, and 155
<Reactive Dyes>
C.I. Reactive Yellow 1, 2, 3, 14, 15, 17, 37, 42, 76, 95, 168, and 175
C.I. Reactive Red 2, 6, 11, 21, 22, 23, 24, 33, 45, 111, 112, 114, 180, 218, 226, 228, and 235
C.I. Reactive Blue 7, 14, 15, 18, 19, 21, 25, 38, 49, 72, 77, 176, 203, 220, 230, and 235
C.I. Reactive Orange 5, 12, 13, 35, and 95,
C.I. Reactive Brown 7, 11, 33, 37, and 46
C.I. Reactive Green 8 and 19
C.I. Reactive Violet 2, 4, 6, 8, 21, 22, and 25
C.I. Reactive Black 5, 8, 31, and 39
<Basic Dyes>
C.I. Basic Yellow 11, 14, 21, and 32
C.I. Basic Red 1, 2, 9, 12, and 13
C.I. Basic Violet 3, 7, and 14
C.I. Basic Blue 3, 9, 24, and 25
Other than those as cited above, listed as dyes capable of being employed in the present invention may be chelate dyes and azo dyes which are employed in so-called silver dye bleach process light-sensitive materials (for example, Cibachrome, manufactured by Ciba-Geigy).
Chelate dyes are described, for example, in British Patent No. 1,077,484.
Azo dyes of said silver dye bleach method light-sensitive materials are described, for example, in British Patent Nos. 1,039,458, 1,004,957, and 1,077,628, and U.S. Pat. No. 2,612,448.
Employed as pigments capable of being used in the present invention may be organic and inorganic pigments, conventionally known in the art. Listed as examples are azo pigments such as azo lakes, insoluble azo pigments, condensation azo pigments, and chelate-azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes and acidic dye lakes, organic pigments such as nitro pigments, nitoroso pigments, aniline black, and daylight fluorescence pigments; and inorganic pigments such as carbon black.
Listed as water-soluble organic solvents employed in the present invention are the examples below.
It is possible to employ alcohols (for example, methanol, ethanol, propanol, isopropanol, butanol, isobutanol, secondary butanol, tertiary butanol, pentanol, hexanol, cyclohexanol, and benzyl alcohol); polyhydric alcohols (for example, ethylene glycol, diethylene glycol, propylene glycol, triethylene glycol, 1,2-buranediol, 1,4-butanediol, 1,2-pentanediol, thiodiglycol, glycerin, and pentaerythritol); polyhydric alcohol ethers (for example, as ethylene glycol monoethyl ether, ethylene glycol monophenyl ether, diethylene glycol monomethyl ether, diethylene glycol monoethyl ether, diethylene glycol dimethyl ether, propylene glycol monomethyl ether, dipropylene glycol monomethyl ether, ethylene glycol monomethyl ether acetate, triethylene glycol monomethyl ether, triethylene glycol monoethyl ether, triethylene glycol monobutyl ether, triethylene glycol dimethyl ether, tripropylene glycol dimethyl ether); amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, tetraethylenepentamine, polyethyleneimine, pentamethyldiethylenetriamine, and tatramethylpropylenediamine); amides (for example, formamide, N,N-dimethylformamide, and N,N-dimethylacetamide; heterocycles (for example, 2-pyrrolidone, N-methyl-2-pyrrolidone, N-cyclohexyl-2-pyrrrolidone, 2-oxazolidone, and 1,3-dimethyl-2-imidazilidinone); sulfoxides (for example, dimethylsulfoxide); sulfones (for example, sulfolane); sulfonate salts (for example, sodium 1-butanesulfonate); urea; acetonitrile; and acetone.

Of these, from the viewpoint of improvement of gradation variation during extended storage, dihydric alcohols are preferably incorporated into water-soluble organic solvents in an amount of at least 50 percent of said water-soluble organic solvents.

Dihydric alcohols are preferably ethylene glycol, propylene glycol, 1,2-butanediol, 1,4-butanediol, and 1,2-pentanediol. Of these, ethylene glycol, as well as propylene glycol, is particularly preferred.

In the present invention, in order to adjust the surface tension of ink, surface active agents may be incorporated. Listed as surface active agents, preferably used in the ink of the present invention, are anionic surface active agents such as dialkyl sulfosuccinates, alkylnaphthalenesulfonates, and higher fatty acid salts; nonionic surface active agents such as polyoxyethylene alkyl ethers, polyoxyethylene alkyl allyl ethers, acetylene glycols, and polyoxyethylene-polyoxypropylene block copolymers; and cationic surface active agents such as alkylamine salts and quaternary ammonium salts. Of these, it is most preferable to employ anionic surface active agents.

A method for preparing each ion of silicon, nickel, barium, zinc, chromium, strontium, aluminum, zirconium, manganese, sodium, potassium, calcium, magnesium, and iron, will now be described.

The concentration of an aqueous dye solution at the specified concentrating is determined employing ICP-AES (Inductively Coupled Plasma-Atomic Emmision Spectroscopy). An ion concentration in a state of ink is calculated in terms of the dye concentration employed in said ink. It is possible to estimate the ion concentration during formation of ink, employing water, distilled water, or deionized water.

Subsequently, ink is prepared by adding other additives, and said ion concentration of the resulting ink is determined employing ICP-AES. When the resulting ion concentration exceeds the target value, it is possible to decrease the ion concentration by passing said aqueous dye solution through ion exchange resins. It is possible to further decrease said ion concentration by passing said aqueous dye solution a plurality of times. When said ion concentration does not reach the desired value through said operations, additives other than dyes may be subjected to treatments such as ion exchange. Further, if desired, treatments such as an activated carbon treatment and filtration utilizing ultrafiltration membranes may be further carried out.

An image receptive sheet will now be described.

Said image receptive sheet comprises a support having thereon an ink receptive layer, and further may have a sublayer between said support and said ink receptive layer.

Ink Receptive Layer

The ink receptive layer, as described herein, refers to the layer which receives ink droplets ejected from an ink-jet head, and is comprised of fillers such as fine organic particles to facilitate ink absorption, and binders.

Listed as examples of fine inorganic particles may be white inorganic pigments such as precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, alumina, colloidal alumina, pseudo boehmite, aluminum hydroxide, lithopone, zeolite, and magnesium hydroxide. Silica is particularly preferred.

Preferably employed as binders used in said ink receptive layer are hydrophilic binders, and it is possible to employ hydrophilic binders conventionally known in the art in ink-jet recording sheets. For example, listed may be gelatin, polyvinyl alcohol, polyethylene oxide, polyvinylpyrrolidone, polyacrylamide, polyacrylic acid, carboxymethyl cellulose, hydroxyethyl cellulose, agar, and dextrin. Of these, polyvinyl alcohol, which exhibits excellent film forming properties, is particularly preferred.

The saponification ratio and average degree of polymerization of used polyvinyl alcohol are preferably from 70 to 100 percent and from 2,000 to 5,000, respectively, and are more preferably from 80 to 99 percent and from 2,200 to 4,500, respectively. In addition to common polyvinyl alcohol which is obtained by hydrolyzing polyvinyl acetate, said polyvinyl alcohol includes modified polyvinyl alcohol which is obtained by being subjected to cationic modification of the terminals, or anionic modification.

The content of said fine inorganic particles incorporated into said ink receptive layer is commonly from 5 to 30 g per $m^2$ of the recording sheet, and is preferably from 10 to 25 g. Further, the weight ratio of said fine inorganic particles to said hydrophilic binders is preferably from 1 to 15, and is more preferably from 1.5 to 8.

Cationic fixing agents are preferably incorporated into said ink receptive layer. Listed as said cationic fixing agents are cationic polymers and fine inorganic particles having a cationic surface. Employed as said dationic polymers may be those conventionally known in the art in ink-jet recording sheets. Listed as these are compounds described in said ink-jet printer techniques and materials, and Japanese Patent Publication Open to Public Inspection No. 9-193532.

Cationic polymers, particularly preferred in the present invention, are polymers having a quaternary ammonium salt group at the main or side chain of said polymers, and include dimethylamine epihydrin condensation products, polydiallyldimethylammonium salts or copolymers thereof, homopolymers or copolymers of vinylbenzyltrimethylammonium salts, homopolymers or copolymers of N,N,N-trimethyl aminoethyl acrylate chloride, and homopolymers or copolymers of N,N,N-trimethyl aminoethyl methacrylate chloride. Specific examples of cationic polymers having said quaternary ammonium salt group, which are preferably employed in the present invention, are illustrated below.

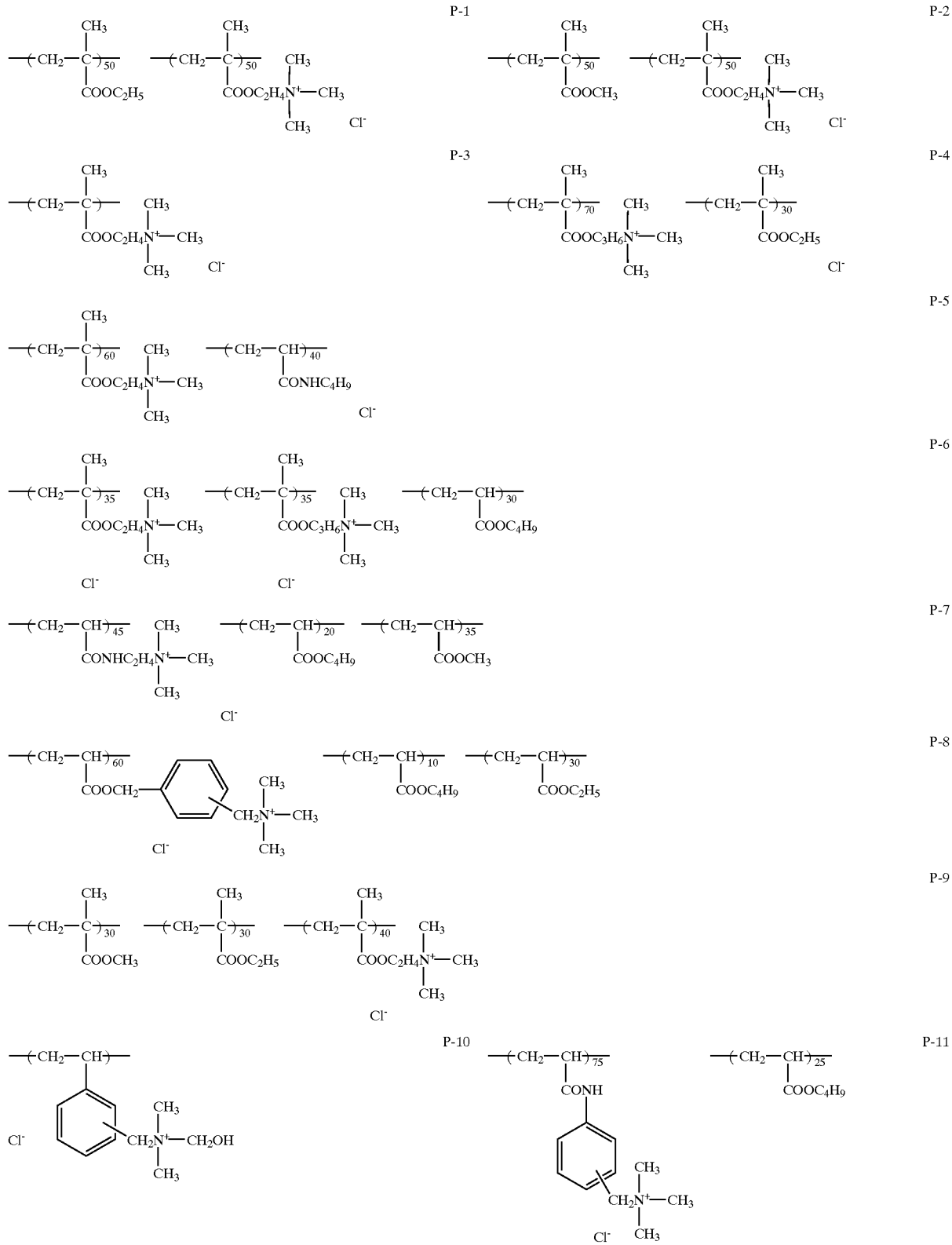

-continued
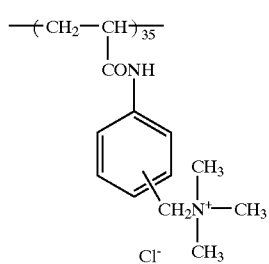
P-12
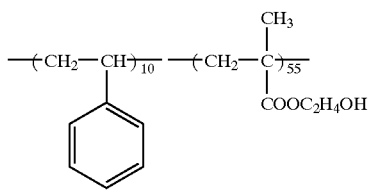
P-13
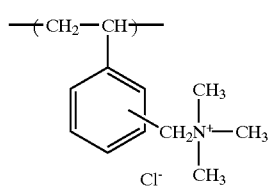
P-14
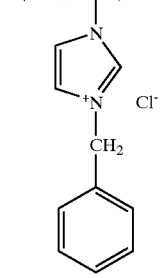
P-15
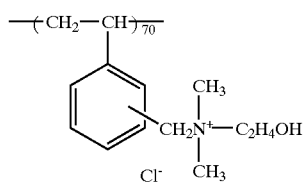 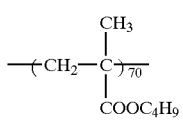
P-16
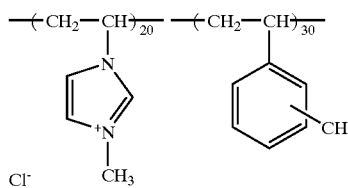
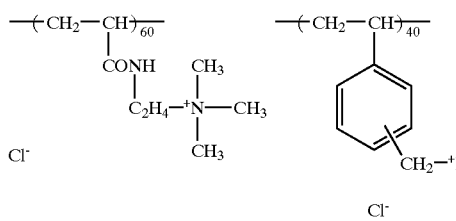
P-17
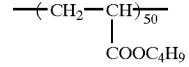
P-18
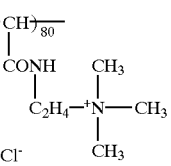
P-19
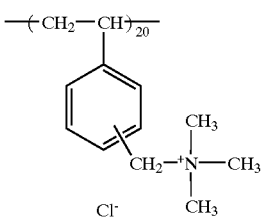
P-20
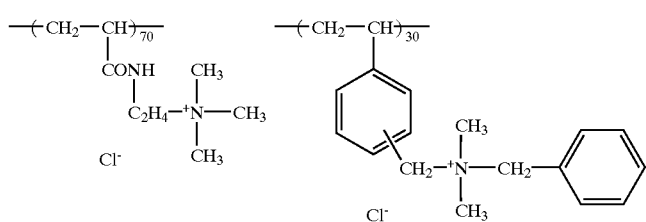

-continued
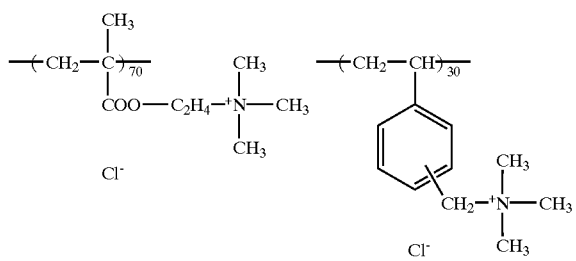
P-21
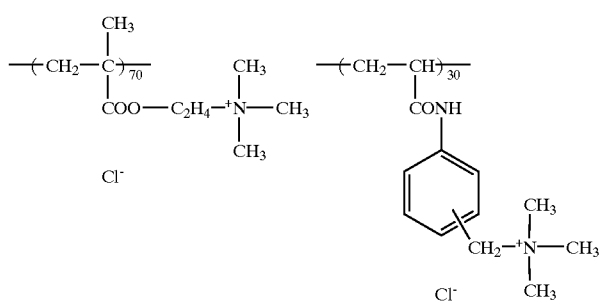
P-22
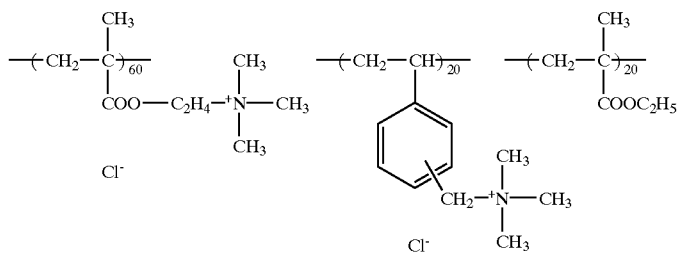
P-23
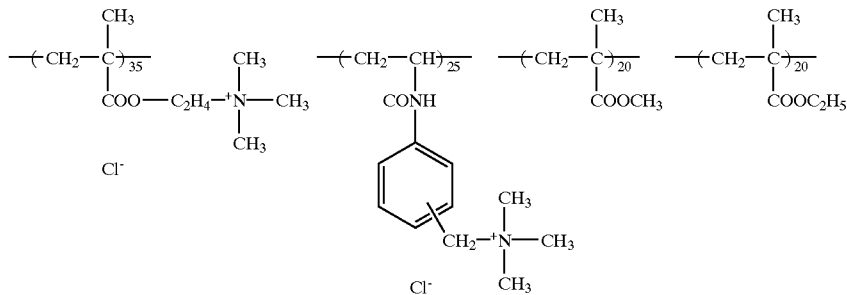
P-24
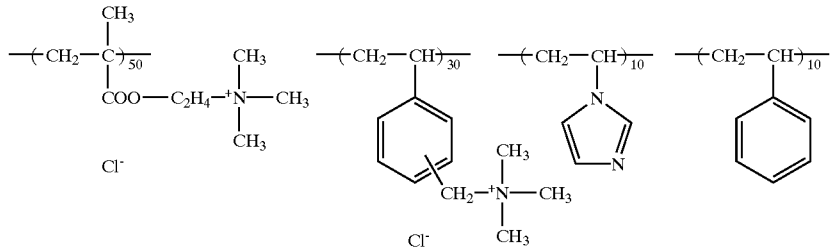
P-25
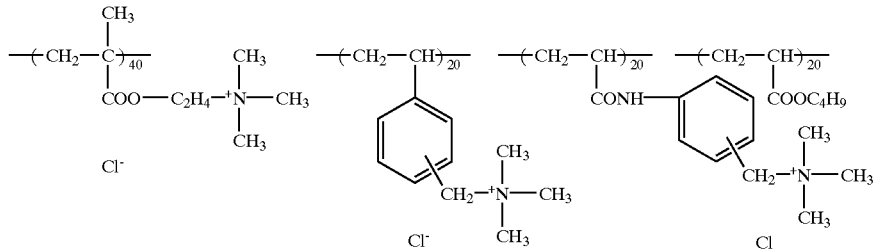
P-26

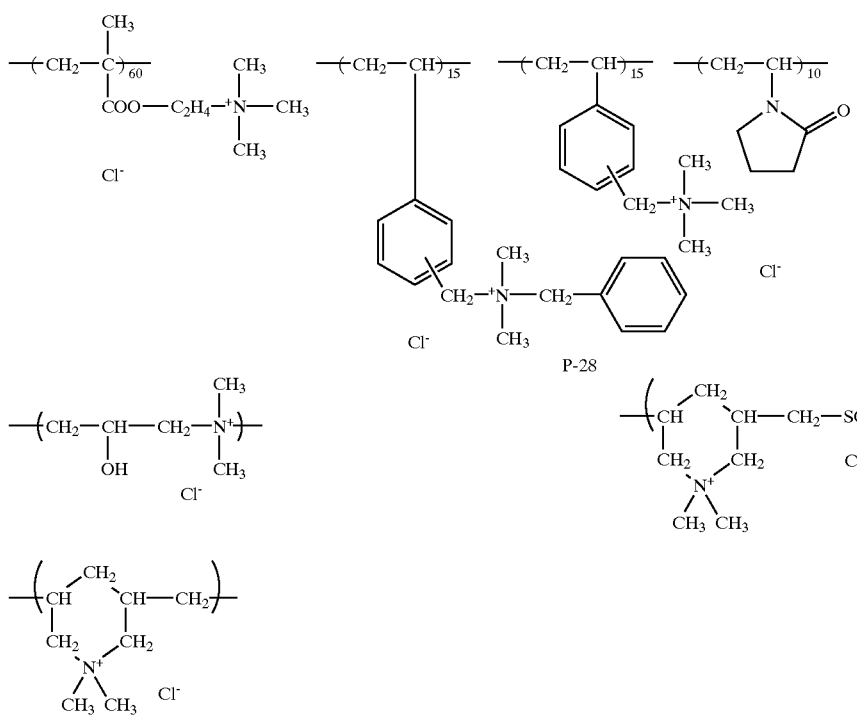

The number average molecular weight of said cationic polymers is preferably from 2,000 to 100,000, and is most preferably from 3,000 to 80,000. The used amount of said cationic polymers is commonly in the range of 0.1 to 10 g per m² of the recording sheet, and is preferably in the range of 0.2 to 5 g.

Fine inorganic particles having a cationic surface include, for example, alumina, pseudo boehmite, cation-modified silica, which is subjected to a surface treatment employing aluminum, and silica particles prepared by allowing the silica particle surface having an anionic surface to react with a group (such as a trimethoxysilyl group) capable of reacting with the cationic group as well as silica particles.

For the purpose of improvement of film forming properties and an increase in water resistance, organic or inorganic cross-linking agents of said hydrophilic binders may be employed in said ink receptive layer.

Listed as said preferable cross-linking agent is boric acid. However, from the viewpoint of the stabilization of gradation in the early stage, it is preferable to employ boric acid together with cross-linking agents other than said boric acid.

EXAMPLES

The present invention will now be specifically described with reference to examples. However, the embodiments of the present invention are not limited to these examples.

Example A

Preparation of Image Receptive Layer 1

Preparation of Support

Both surfaces of a 200 g/m² paper substrate were covered with PE (polyethylene) comprised of a mixture of titanium oxide containing HDPE (high density polyethylene), and LDPE (low density polyethylene), to obtain a coated layer thickness of 31 μm, employing a melt extrusion method. The surface was subjected to corona discharge treatment and subsequently provided with a gelatin sublayer.

Onto said gelatin sublayer, the coating composition having the composition described below was applied to obtain a wet layer thickness of 180 μm, employing a slide hopper system, whereby an ink receptive layer at a dried layer thickness of 40 μm was provided. Thus, Image Receptive Layer 1 was prepared.

Composition of Coating Composition (per liter):

| | |
|---|---|
| Silica synthesized employing a gas phase method (QS-20, manufactured by Tokuyama) | 90 g |
| Cationic polymer P-13 | 8 g |
| Polyvinyl alcohol (having an average degree of polymerization of 3,500 and a saponification ratio of 88 percent) | 10 g |
| Polyvinyl alcohol (having an average degree of polymerization of 4,500 and a saponification ratio of 88 percent) | 5 g |
| Boric acid | 0.8 g |
| Borax | 0.4 g |
| Saponin | 0.10 g |
| Betaine type fluorine based surface active agent FS-1 | 0.02 g |

The coating composition was prepared as follows. After dispersing silica powder into deionized water, an aqueous cationic polymer solution, boric acid and borax, an aqueous solution prepared by mixing two types of polyvinyl alcohol, saponin, and FS-1 were successively added.

Coating was carried out at 40° C. After said application, the coating was temporarily cooled at 5° C. for 10 seconds. Thereafter, drying was carried out over 20 seconds employing a 20° C. air flow, followed by 1 minute employing a 65° C. air flow, 1 minute employing a 50° C. air flow, and 1 minute employing a 40° C. air flow.

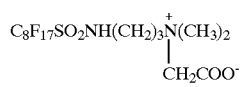

FS-1

The average void diameter was determined at an initial pressure of 0.1 MPa, employing a mercury porosimeter (Shimadzu Pore Analyzer type 9220), resulting in the average void diameter of 20 nm.

Preparation of Image Receptive Layer 2

Image Receptive Layer 2 was prepared in the same manner as Image Receptive Layer 1, except that cationic polymer P-13 was not employed.

Preparation of Ink Set 1 (Example 1)

Ten percent aqueous solution of each of the dyes described below was passed through activated carbon, and subsequently passed three times through ion exchange resins. Further, the resulting solution was subjected to ultrafiltration, and the decreased water amount was supplemented with deionized water.

| Pale Cyan Ink | |
|---|---|
| Ethylene glycol | 24 weight parts |
| Propylene glycol | 22 weight parts |
| Acid Blue 9 (10 percent aqueous solution) | 7.5 weight parts |
| Preventol (manufactured by Bayer Co.) | 0.2 weight part |
| Proxel (manufactured by Zeneca Pharmaceuticals) | 0.04 weight part |
| Deionized water to make | 100 weight parts |
| Dark Cyan Ink | |
| Ethylene glycol | 15 weight parts |
| Propylene glycol | 25 weight parts |
| Acid Blue 9 (10 percent aqueous solution) | 36 weight parts |
| Preventol | 0.2 weight part |
| Proxel | 0.04 weight part |
| Deionized water to make | 100 weight parts |

Preparation of Ink Set 2 (Comparative Example 2)

Ink Set 2 was prepared in the same manner as Ink Set 1, except that 10 percent aqueous solution of each of said dyes was not subjected to each of said active carbon treatment, ion exchange treatment, and ultrafiltration, and water was replaced with well water.

Preparation of Ink Set 3 (Example 3)

A ten percent aqueous solution of each of dyes described below was passed through active carbon, and subsequently passed three times through ion exchange resins. Further the resulting solution was subjected to ultrafiltration, and decreased water was supplemented with deionized water.

| Pale Magenta Ink | |
|---|---|
| Ethylene glycol | 24 weight parts |
| Propylene glycol | 22 weight parts |
| Acid Red 52 (10 percent aqueous solution) | 9.57 weight parts |
| Surface Active Agent (Orufin E1010, manufactured by Nisshin Kagaku Co.) | 0.05 weight part |
| Preventol | 0.2 weight part |
| Proxel | 0.04 weight part |
| 1 mol/L NaOH | 0.032 weight part |
| Deionized water to male | 100 weight parts |

| Dark Magenta Ink | |
|---|---|
| Ethylene glycol | 7.5 weight parts |
| Propylene glycol | 40 weight parts |
| Acid Red 52 (10 percent aqueous solution) | 38.25 weight parts |
| EDTA4Na | 0.3 weight part |
| Preventol | 0.2 weight part |
| Proxel | 0.04 weight part |
| Deionized water to make | 100 weight parts |

Preparation of Ink Set 4 (Example 4)

Ink Set 4 was prepared in the same manner as Ink Set 3, except that 10 percent aqueous solution of each of said dyes was passed through active carbon and once through ion exchange resins, and was not subjected to ultrafiltration.

| Pale Magenta Ink | |
|---|---|
| Ethylene glycol | 24 weight parts |
| Propylene glycol | 22 weight parts |
| Acid Red 52 (10 percent aqueous solution) | 9.57 weight parts |
| Surface active agent (Orufin E1010) | 0.05 weight part |
| Preventol | 0.2 weight part |
| Proxel | 0.04 weight part |
| 1 mol/L NaOH | 0.032 weight part |
| Deionized water to make | 100 weight parts |
| Dark Magenta Ink | |
| Ethylene glycol | 7.5 weight parts |
| Propylene glycol | 40 weight parts |
| Acid Red 52 (10 percent aqueous solution) | 38.25 weight parts |
| EDTA4Na | 0.3 weight part |
| Preventol | 0.2 weight part |
| Proxel | 0.04 weight part |
| Deionized water to make | 100 weight parts |

Preparation of Ink Set 5 (Example 5)

A ten percent aqueous solution of each of dyes described below was passed through active carbon, and subsequently passed three times through ion exchange resins. Further the resulting solution was subjected to ultrafiltration, and decreased water was supplemented with deionized water.

| Pale Yellow Ink | |
|---|---|
| Ethylene glycol | 24 weight parts |
| Propylene glycol | 22 weight parts |
| Direct Yellow 86 (10 percent aqueous solution) | 1.97 weight parts |
| Acid Yellow 79 (10 percent aqueous solution) | 10.24 weight parts |
| Preventol | 0.2 weight part |
| Proxel | 0.04 weight part |
| 1 mol/L NaOH | 0.028 weight part |
| Deionized water to make | 100 weight parts |
| Dark Yellow Ink | |
| Ethylene glycol | 18 weight parts |
| Propylene glycol | 27 weight parts |
| Direct Yellow 86 (10 percent aqueous solution) | 7.88 weight parts |
| Acid Yellow 79 (10 percent aqueous solution) | 40.95 weight parts |
| Preventol | 0.2 weight part |

-continued

| | |
|---|---|
| Proxel | 0.04 weight part |
| Deionized water to make | 100 weight parts |
| Pale Magenta Ink | |
| Ethylene glycol | 24 weight parts |
| Propylene glycol | 22 weight parts |
| Acid Red 249 (10 percent aqueous solution) | 9.57 weight parts |
| Surface active agent (Orufin E1010) | 0.05 weight part |
| Preventol | 0.2 weight part |
| Proxel | 0.04 weight part |
| 1 mol/L NaOH | 0.032 weight part |
| Deionized water to make | 100 weight parts |
| Dark Magenta Ink | |
| Ethylene glycol | 7.5 weight parts |
| Propylene glycol | 40 weight parts |
| Acid Red 249 (10 percent aqueous solution) | 38.25 weight parts |
| EDTA4Na | 0.3 weight part |
| Preventol | 0.2 weight part |
| Proxel | 0.04 weight part |
| Deionized water to make | 100 weight parts |
| Pale Cyan Ink | |
| Ethylene glycol | 24 weight parts |
| Propylene glycol | 22 weight parts |
| Direct Blue 199 (10 percent aqueous solution) | 9.23 weight parts |
| Surface active agent (Orufin E1010) | 0.1 weight part |
| Preventol | 0.2 weight part |
| Proxel | 0.04 weight part |
| 1 mol/L NaOH | 0.032 weight part |
| Deionized water to make | 100 weight parts |
| Dark Cyan Ink | |
| Ethylene glycol | 7.5 weight parts |
| Propylene glycol | 40 weight parts |
| Direct Blue 199 (10 percent aqueous solution) | 36.9 weight parts |
| Preventol | 0.2 weight part |
| Proxel | 0.04 weight part |
| Deionized water to make | 100 weight parts |

Each of a pale black ink and a dark black ink was prepared by blending materials described below followed by passing ion exchange resins.

| | |
|---|---|
| Pale Black Ink | |
| Ethylene glycol | 24 weight parts |
| Propylene glycol | 22 weight parts |
| Direct Yellow 86 (10 percent aqueous solution) | 4.69 weight parts |
| Direct Red 249 (10 percent aqueous solution) | 7.88 weight parts |
| Direct Blue 199 (10 percent aqueous solution) | 5.91 weight parts |
| Surface active agent (Orufin E1010) | 0.05 weight part |
| Preventol | 0.2 weight part |
| Proxel | 0.04 weight part |
| Deionized water to make | 100 weight parts |
| Dark Black Ink | |
| Ethylene glycol | 24 weight parts |
| Propylene glycol | 22 weight parts |
| Deionized water | 42 weight parts |
| Direct Yellow 86 (powder) | 2.94 weight parts |
| Acid. Red 249 (powder) | 3.96 weight parts |
| Direct Blue 199 (powder) | 2.5 weight parts |
| Surface active agent (Orufin E1010) | 0.08 weight part |
| Preventol | 0.2 weight part |
| Proxel | 0.04 weight part |
| Deionized water to make | 100 weight parts |

The metal ions in each of said inks were determined employing ICP-AES (SPS-4000, manufactured by Seiko Denshi Kogyo).

Preparation of Ink Set 6 (Example 6)

Ink Set 6 was prepared in the same manner as Ink Set 5, except that Pale Black Ink as well as Pale Yellow Ink was not employed.

Preparation of Ink Set 7 (Example 7)

Ink Set 7 was prepared in the same manner as Ink Set 5, except that Dark Cyan Ink and Pale Cyan Ink were replaced with those of Ink Set 2.

Comparative Set (Comparative Example 2)

A Comparative Set was prepared in the same manner as Ink Set 5, except that activated carbon, ion exchange, and ultrafiltration treatments were not carried out. Printing Each ink of said ink sets was ejected at the conditions described below, employing the ink-jet head utilizing a piezo electric ceramic described in Japanese Patent Publication Open to Public Inspection No. 11-99644. Each of Examples 1 through 7 and Comparative Examples 1 and 2 was recorded on Image Receptive Sheet 1.

Ejection Conditions

Driving frequency: 30 kHz

Volume of droplet: 7 pl

Recording density: 720 dpi (herein, dpi refers to the number of dots per 2.54 cm)

Recording Image: by varying the dot density per unit area, an image having gradation was prepared. Dots formed by a dark ink and a pale ink were arranged so as to result in smooth connection of gradation one minute after image recording Storage Conditions of Images Images were visually observed one minute after printing, and then the resulting images were also visually observed 3 hours, 24 hours, and one week after being stored at 23° C. and 60 percent relative humidity.

Method for Measuring Surface Tension

The surface tension of each sample was determined at 23° C. and 55 percent relative humidity, employing a Wilhelmie type surface tensiometer.

Evaluation

Gradation Continuity

A: gradation continuity was smooth during one-week storage

B: degradation of gradation continuity was noticed when observed after one-week storage C: degradation of gradation continuity was noticed when observed after 24-hour storage D: degradation of gradation continuity was noticed when observed after 3-hour storage.

Color Balance in Low Density Area and High Density Area.

A: color balance was maintained from the low density area to the high density area during one-week storage B: color balance varied when observed after one-week storage C: color balance varied when observed after 24-hour storage D: color balance varied when observed after 3-hour storage.

TABLE 1

|  |  | Example 1 | Comparative Example 1 | Example 3 | Example 4 | Example 5 | Example 6 | Example 7 | Comparative Example 2 |
|---|---|---|---|---|---|---|---|---|---|
| Dark Cyan Ink | surface tension (mN/m) | 45.0 | 26.0 |  |  | 47.0 | 47.0 | 45.0 | 24.0 |
|  | Ca + Mg + Fe (ppm) | 5.0 | 22.0 |  |  | 9.0 | 9.0 | 5.0 | 25.0 |
|  | Mg (ppm) | 1.5 | 6.5 |  |  | 1.0 | 1.0 | 1.5. | 6.5 |
|  | Ca (ppm) | 2.5 | 12.0 |  |  | 1.0 | 1.0 | 2.5 | 16.0 |
| Pale Cyan Ink | surface tension (mN/m) | 43.0 | 39.0 |  |  | 41.0 | 41.0 | 43.0 | 36.0 |
|  | Ca + Mg + Fe (ppm) | 2.5 | 16.0 |  |  | 3.0 or less | 3.0 or less | 2.5 | 12.0 |
|  | Mg (ppm) | 0.5 | 5.0 |  |  | 0.5 or less | 0.5 or less | 0.5 | 3.0 |
|  | Ca (ppm) | 1.0 | 10.0 |  |  | 0.5 or less | 0.5 or less | 1.0 | 4.5 |
| Cyan Ink | σ2/σ1 | 0.96 | 0.67 |  |  | 0.87 | 0.87 | 0.96 | 0.67 |
| Dark Magenta Ink | surface tension (mN/m) |  |  | 49.0 | 32.0 | 47.0 | 47.0 | 47.0 | 22.0 |
|  | Ca + Mg + Fe (ppm) |  |  | 5.0 | 11.0 | 7.0 | 7.0 | 7.0 | 42.0 |
|  | Mg (ppm) |  |  | 1.5 | 3.0 | 1.5 | 1.5 | 1.5 | 19.0 |
|  | Ca (ppm) |  |  | 2.0 | 2.0 | 2.0 | 2.0 | 2.0 | 29.0 |
|  | Na |  |  |  |  | 120 | 120 | 120 | 2700 |
|  | K |  |  |  |  | 200 | 200 | 200 | 3500 |
|  | Si |  |  |  |  | 1.0 | 1.0 | 1.0 | 35.0 |
|  | Ni |  |  |  |  | 1.0 or less | 1.0 or less | 1.0 or less | 11.0 |
|  | Ba |  |  |  |  | 1.5 | 1.5 | 1.5 | 9.5 |
|  | Zn |  |  |  |  | 0.8 | 0.8 | 0.8 | 8.0 |
|  | Cr |  |  |  |  | 1.0 or less | 1.0 or less | 1.0 or less | 5.5 |
|  | Sr |  |  |  |  | 0.5 or less | 0.5 or less | 0.5 or less | 5.0 |
|  | Mn |  |  |  |  | 1.7 | 1.7 | 1.7 | 10.5 |
|  | Al |  |  |  |  | 5.0 or less | 5.0 or less | 5.0 or less | 18.0 |
|  | Zr |  |  |  |  | 1.3 | 1.3 | 1.3 | 13.0 |
| Pale Magenta Ink | surface tension (mN/m) |  |  | 43.0 | 41.0 | 43.0 | 43.0 | 43.0 | 40.0 |
|  | Ca + Mg + Fe (ppm) |  |  | 2.5 | 6.0 | 3.0 or less | 3.0 or less | 3.0 or less | 16.0 |
|  | Mg (ppm) |  |  | 0.5 | 1.5 | 0.5 or less | 0.5 or less | 0.5 or less | 6.5 |
|  | Ca (ppm) |  |  | 1.0 | 2.0 | 1.0 | 1.0 | 1.0 | 9.0 |
|  | Na |  |  |  |  | 26 | 26 | 26 | 660 |
|  | K |  |  |  |  | 48 | 48 | 48 | 830 |
|  | Si |  |  |  |  | 1.0 or less | 1.0 or less | 1.0 or less | 12.0 |
|  | Ni |  |  |  |  | 1.0 or less | 1.0 or less | 1.0 or less | 3.5 |
|  | Ba |  |  |  |  | 1.0 or less | 1.0 or less | 1.0 or less | 3.0 |
|  | Zn |  |  |  |  | 1.0 or less | 1.0 or less | 1.0 or less | 3.0 |
|  | Cr |  |  |  |  | 1.0 or less | 1.0 or less | 1.0 or less | 2.5 |
|  | Sr |  |  |  |  | 0.5 or less | 0.5 or less | 0.5 or less | 1.5 |
|  | Mn |  |  |  |  | 1.0 or less | 1.0 or less | 1.0 or less | 3.0 |
|  | Al |  |  |  |  | 5.0 or less | 5.0 or less | 5.0 or less | 7.0 |
|  | Zr |  |  |  |  | 1.0 or less | 1.0 or less | 1.0 or less | 3.0 |
| Magenta Ink | σ2/σ1 |  |  | 0.88 | 0.78 | 0.91 | 0.91 | 0.91 | 0.55 |

TABLE 2

|  |  | Example 1 | Comparative Example 1 | Example 3 | Example 4 | Example 5 | Example 6 | Example 7 | Comparative Example 2 |
|---|---|---|---|---|---|---|---|---|---|
| Dark Yellow Ink | surface tension (mN/m) |  |  |  |  | 47.0 | 47.0 | 47.0 | 28.0 |
|  | Ca + Mg + Fe (ppm) |  |  |  |  | 5.0 | 5.0 | 5.0 | 33.0 |
|  | Mg (ppm) |  |  |  |  | 1.5 | 1.5 | 1.5 | 9.5 |
|  | Ca (ppm) |  |  |  |  | 1.5 | 1.5 | 1.5 | 13.0 |
| Pale Yellow Ink | surface tension (mN/m) |  |  |  |  | 49.0 |  | 49.0 | 46.0 |
|  | Ca + Mg + Fe (ppm) |  |  |  |  | 3.0 or less |  | 3.0 or less | 11.0 |
|  | Mg (ppm) |  |  |  |  | 0.5 or less |  | 0.5 or less | 3.5 |
|  | Ca (ppm) |  |  |  |  | 0.5 or less |  | 0.5 or less | 4.0 |
| Yellow Ink | σ2/σ1 |  |  |  |  | 0.96 |  | 0.96 | 0.61 |
| Dark Black Ink | surface tension (mN/m) |  |  |  |  | 41.0 | 41.0 | 41.0 | 22.0 |
|  | Ca + Mg + Fe (ppm) |  |  |  |  | 3.5 | 3.5 | 3.5 | 16.0 |
|  | Mg (ppm) |  |  |  |  | 1.0 | 1.0 | 1.0 | 4.5 |
|  | Ca (ppm) |  |  |  |  | 1.0 | 1.0 | 1.0 | 6.0 |
| Pale Black Ink | surface tension (mN/m) |  |  |  |  | 41.0 |  | 41.0 | 32.0 |
|  | Ca + Mg + Fe (ppm) |  |  |  |  | 3.0 or less |  | 3.0 or less | 11.0 |
|  | Mg (ppm) |  |  |  |  | 0.5 or less |  | 0.5 or less | 2.5 |
|  | Ca (ppm) |  |  |  |  | 0.5 or less |  | 0.5 or less | 3.5 |
| Black Ink | σ2/σ1 |  |  |  |  | 1.00 |  | 1.00 | 0.69 |
| Entire Ink |  |  |  |  |  | 0.84 | 0.87 | 0.84 | 0.48 |
| Effects | gradation continuity during | A | C | A | B | A | A | C | D |

TABLE 2-continued

|  | | Example 1 | Comparative Example 1 | Example 3 | Example 4 | Example 5 | Example 6 | Example 7 | Comparative Example 2 |
|---|---|---|---|---|---|---|---|---|---|
| | storage color balance in low density and high density areas | | | | | A | B | C | D |
| Number of Colors | | | | | | 8 colors | 6 colors | 8 colors | 8 colors |

Example B

Printing was carried out in the same manner as Example 5, except that Image Receptive Sheet 2 which does not contain a cationic polymer p-13 was employed, and the same evaluation was conducted.

The evaluation results were as follows: gradation continuity was "C" and color balance was "B".

As proved in the examples, the ink set and recording method according to the present invention exhibit excellent effects which make it possible to maintain smooth gradation over a long period of time after printing and, further, to maintain color balance over a long period of time after printing.

What is claimed is:

1. An ink set for ink-jet recording, comprising:
   a first group of inks exhibiting a first hue and having different color densities and containing a colorant, water-soluble organic solvent and water,
   wherein among the group of inks, an ink has a largest surface tension σ1 and another ink has a smallest surface tension σ2, and said σ1 and said σ2 satisfy the following conditional formula:

$\sigma 2/\sigma 1 > 0.7$, and wherein at least one of the inks contains iron ions, magnesium ions and calcium ions such that a total amount of the iron ions, the magnesium ions and the calcium ions is not more than 10 ppm by weight.

2. The ink set of claim 1, wherein the inks each contain the iron ions of 0.01 to 3 ppm by weight.

3. The ink set of claim 1, wherein the inks each contain the magnesium ions of not more than 2 ppm by weight.

4. The ink set of claim 1, wherein the inks each contain the magnesium ions of 0.01 to 2 ppm by weight.

5. The ink set of claim 1, wherein the inks each contain the calcium ions of not more than 3 ppm by weight.

6. The ink set of claim 1, wherein the inks each contain silicon of not more than 10 ppm by weight.

7. The ink set of claim 1, wherein the inks each contain nickel of not more than 2.0 ppm by weight.

8. The ink set of claim 1, wherein the inks each contain barium of not more than 2.0 ppm by weight.

9. The ink set of claim 1, wherein the inks each contain zinc of not more than 2.0 ppm by weight.

10. The ink set of claim 1, wherein the inks each contain chromium of not more than 2.0 ppm by weight.

11. The ink set of claim 1, wherein the inks each contain strontium of not more than 1.0 ppm by weight.

12. The ink set of claim 1, wherein the inks each contain aluminum of not more than 5.0 ppm by weight.

13. The ink set of claim 1, wherein the inks each contain zirconium of not more than 10 ppm by weight.

14. The ink set of claim 1, wherein the inks each contain zirconium of not more than 2.0 ppm by weight.

15. The ink set of claim 1, wherein the inks each contain manganese of not more than 2.0 ppm by weight.

16. The ink set of claim 1, wherein an ink of the group of inks contains sodium ions of not more than 500 ppm by weight.

17. The ink set of claim 1, wherein the inks each contain potassium ions of not more than 500 ppm by weight.

18. The ink set of claim 1, wherein the inks each contain a complexing agent.

19. The ink set of claim 1, wherein said σ1 and said σ2 satisfy the following condition formula:

$\sigma 2/\sigma 1 > 0.85$.

20. The ink set of claim 19, further comprising:
   a second group of inks each ink of which has a different color density of a second hue and contains a colorant, water-soluble organic solvent and water, the second hue being different from the first hue of the first group of inks, and a third group of inks each ink of which has a different color density of a third hue and contains a colorant, water-soluble organic solvent and water, the third hue being different from the first hue of the first group of inks and the second hue of the second group of inks, so that the ink set comprises seven different inks or more,
   wherein among each of the second group of inks and the third group of inks, an ink has a largest surface tension σ1 and another ink has a smallest surface tension σ2, and said σ1 and said σ2 satisfy the following conditional formula:

$\sigma 2/\sigma 1 > 0.85$.

21. The ink set of claim 1, further comprising:
   a second group of inks exhibiting a second hue and having different color densities and containing a colorant, water-soluble organic solvent and water,
   wherein among all groups of inks, an ink has a largest surface tension σmax and another ink has a smallest surface tension σmin, and said σmax and said σmin satisfy the following conditional formula:

$\sigma min/\sigma max > 0.6$.

22. The ink set of claim 21, wherein at least two of the inks exhibit black color and have different color densities.

23. The ink set of claim 1, further comprising:
   a second group of inks each ink of which has a different color density of a second hue and contains a colorant, water-soluble organic solvent and water, the second hue being different from the first hue of the first group of inks, and a third group of inks each ink of which has a different color density of a third hue and contains a colorant, water-soluble organic solvent and water, the third hue being different from the first hue of the first group of inks and the second hue of the second group of inks, so that the ink set comprises seven different inks or more, wherein among each of the second group of inks and the third group of inks, an ink has a largest surface tension σ1 and another ink has a smallest surface tension σ2, and said σ1 and said σ2 satisfy the following conditional formula:

σ2/σ1>0.7.

24. The ink set of claim 1, wherein the inks each contain a dihydric alcohol of not less than 50% by weight of water-soluble organic solvents contained in said ink.

25. An ink-jet recording method comprising the step of: jetting an ink of the ink set of claim 1 from a n ink-jet head to an ink-jet recording media;

wherein the recording media comprises a support having thereon a porous ink receptive layer containing inorganic particles and a hydrophilic binder.

26. The ink-jet recording method of claim 25, wherein the inorganic particles are made of silica.

27. The ink-jet recording method of claim 26, wherein the the porous ink receptive layer contains voids having a diameter of 10 to 100 nm.

28. The ink-jet recording method of claim 27, wherein the porous ink receptive layer contains a cationic fixing agent.

* * * * *